Patented Feb. 15, 1949

2,461,612

UNITED STATES PATENT OFFICE 2,461,612

DYEING OF RESINS WITH POLYHYDROXY ALCOHOL ASSISTANTS

Henry Charles Olpin and Alexander James Wesson, Spondon, near Derby, England, assignors, by mesne assignments, to Celanese Corporation of America, a corporation of Delaware No Drawing. Application April 5, 1945, Serial No. 586,830. In Great Britain April 18, 1944

2 Claims. (Cl. 8—4)

This invention relates to the production of coloured articles of synthetic resins.

Coloured synthetic resin products in the form of sheets, rods, tubes, mouldings, and other articles are commonly prepared by mixing a colouring matter with the synthetic resin at some stage in the manufacture of the resin or of the article. It is frequently desired, however, to colour sheets, rods, blocks, mouldings or like solid products of synthetic resin after their manufacture, and of course without damaging the product in any way. Further, it is often required to effect such colouration of transparent synthetic resin products while retaining the transparency.

It has been found that solutions of dyes, particularly water-insoluble dyes, in polyhydric alcohols or esters or ethers thereof are very useful for the colouration of sheets, rods, tubes and other articles of synthetic resin. By their aid it is possible to colour synthetic resin products in very full shades without the blistering or other damage which often occurs when it is attempted to colour these products by immersing them in solutions of dyes in organic liquids such as, for example, ethyl alcohol. Moreover, most of the polyhydric alcohols and their esters and ethers are of low volatility in comparison, for example, with ethyl alcohol, and are therefore convenient in use even at temperatures substantially above atmospheric.

The new colouring process can be applied to articles of synthetic resins of a wide range of types including synthetic resins of the kind which are substantially infusible and substantially insoluble in organic liquids. These resins include the phenol-aldehyde and phenol-ketone type of resin, for example, the well known resins obtainable from phenols and formaldehyde. Again, the process can be applied to articles of synthetic resins obtainable by the interaction of formaldehyde and a compound containing two nitrogen atoms linked directly to the same carbon atom and in which each of the said nitrogen atoms carries a hydrogen atom; the urea-formaldehyde, thiourea-formaldehyde, and melamine-formaldehyde resins are examples of products of this kind. Another class of resin to which the process may be applied is that of the resinous products obtainable by polymerisation of unsaturated organic compounds and especially those obtainable by the polymerisation of unsaturated esters. Such unsaturated esters can be those of unsaturated alcohols, for example vinyl carboxylic esters, e.g. vinyl acetate, or esters of unsaturated alcohols with polycarboxylic acids, e.g. di-allyl phthalate. Again, they can be polymerisation products of esters of unsaturated acids, for example esters of acrylic acid or its homologues, e.g. methyl methacrylic ester. In particular, synthetic resins containing polar groups, for example hydroxyl groups, keto groups, and carboxylic ester groups are amenable to colouration by the new process.

The term "polyhydric alcohol" is used as including dihydric alcohols. It is also used to include not only alcohols in which two or more hydroxyl groups are attached to an aliphatic hydrocarbon radicle but also alcohols in which the hydroxyl groups are attached to an aliphatic residue containing ether oxygens or sulphur atoms as in the polyalkylene glycols and beta-beta-di-hydroxy-diethyl - sulphide (thio - digly - col). Examples of the polyhydric alcohols or esters or ethers thereof which may be employed are glycol, glycerol, diethylene glycol, tri-ethylene glycol, beta-beta-dihydroxy-diethyl-sulphide, and the esters and ethers thereof (including partial esters, partial ethers, and ether esters). Mono-, di-, and tri-acetin, glycol-mono-methyl-ether, diethylene glycol-mono-ethyl ether, glycol-mono-methyl - ether - acetate and diethylene glycol mono-methyl-ether-acetate are examples of such esters and ethers.

Compounds of the foregoing type which are miscible with water to the extent of at least 20 percent of their weight, e.g. in all proportions, have been found particularly useful. The polyhydric alcohols and esters and ethers thereof, which should have a boiling point of at least 120° C., may be employed alone or diluted with another liquid, particularly water, for example in quantity by weight up to that of the polyhydric alcohol or ester or ether thereof. Glycerol alone and mixtures of diethylene glycol or glycerol with water have been found very useful; for example a mixture of 2 parts diethylene glycol with 1 part of water by volume or a mixture of 2 parts of glycerol with 1 part water by volume, can be employed.

The dyes can, as indicated above, be of the water-insoluble type, the dyes of this kind which can be used in the form of aqueous dispersions to colour cellulose acetate materials having been found very useful. These water-insoluble dyes can, for example, be of the amino anthraquinone or azo series or they can be aromatic nitro compounds containing a nuclear amino group and, preferably, at least two aryl nuclei. Examples of the latter kind are the nitro diarylamines and the nitro amino derivatives of diarylmethanes, e.g. of diphenyl and diphenyl methane. The following are specific examples of water-insoluble dyes which may be employed either singly or as mixtures:

4:4' - diamino - 3:3' - dinitro - diphenyl methane (yellow)
4-nitro-4'-amino-2':5' - dimethyl - azo - benzene (red)
4-nitro-4'-amino-2':5'-dimethoxy - azo - benzene (red)
4-nitro-2'-methyl-4'-di-(beta-hydroxy - ethyl) - amino-azo-benzene (red)
1:4-di-(beta-hydroxy-ethyl-amino) -5- hydroxy - anthraquinone (greenish-blue)
1:4:5:8-tetramino anthraquinone (blue)
1-amino-4-methylamino anthraquinone (blue-violet)

Water-soluble dyes can, however, be employed, for example basic dyes and acid dyes, the latter including dyes owing their water-solubility to the presence of a sulphonic group, a carboxylic group or an acid-sulphuric-ester group.

Temperatures substantially above atmospheric in general facilitate the colouring operation, for example temperatures of from 50° C. up to 180° C. and particularly 130°–180° C. Where the temperature employed is higher than the boiling point of the dye liquid at atmospheric pressure the treatment of the synthetic resin articles may be carried out in a closed vessel under the requisite pressure. Thus solutions of dyes in glycerol can be employed at 140° to 180° C. under ordinary pressure and solutions of dyes in the aqueous glycerol referred to above can be employed at similar temperatures, e. g. at about 150° C., in an autoclave. This latter method of working has been found particularly useful in the case of colouring articles of polymerised unsaturated esters, for example polymerised diallyl phthalate.

The invention is illustrated by the following examples.

Example 1

Sheets about 0.2" thick and consisting substantially of resin made by polymerising diallyl phthalate are placed in a steel autoclave and covered with a solution containing 1.5 grams of 4-nitro - 4'-amino - 2':5' - dimethoxy-azo-benzene and 1.5 grams of 1-amino-4-methylamino anthraquinone per 100 ccs. of a mixture of 2 parts by volume of glycerol with 1 part by volume of water. The autoclave is then closed and heated at 150° C. for 4 hours. By this treatment the resin sheets are coloured very deeply so as to transmit substantially only red light and without material loss of quality.

By substituting glycerol for the mixture of glycerol and water in this example and heating to 170° C. without pressure, similar results can be obtained.

Example 2

A dye bath is prepared containing 1.2 grams of 4-nitro-4'-amino-2':5'-dimethoxy - azo - benzene per 60 cc. of a mixture of 2 parts by volume of diethylene glycol with 1 part by volume of water. After heating to 80° C. sheet material of phenol formaldehyde resin 0.2" thick is introduced and the dyeing continued until the desired depth of shade is obtained. After 4 hours, for example, a deep red colouration is obtained.

By substituting for the dye in this example, 1.2 grams of a mixture of 10 parts of 1:4-di(beta-hydroxyethyl - amino) - 5 - hydroxy - anthra - quinone, 4 parts of 4-nitro-4'-amino-2':5'-dimethoxy-azo-benzene and 1 part of 4-nitro-4'-amino-2':5'-dimethyl-azo-benzene, a very deeply coloured material transmitting substantially only red light is obtained. Again by using 1.2 grams of 1:4-di(beta-hydroxyethyl-amino)-5-hydroxy-anthraquinone and 1.2 grams 3:3'-dinitro-4:4'-diamino-diphenyl-methane there is obtained after two hours a deeply coloured material which transmits predominantly green light.

Having described our invention, what we desire to secure by Letters Patent is:

1. Process for the coloration of articles of polymerized diallyl phthalate synthetic resins which are substantially infusible and substantitally insoluble in organic liquids and of which the skeleton of the molecules contain carbon atoms, which comprises subjecting the articles at a temperature of 130–180° C. to the action of a solution of a dye in a mixture of glycerol and water containing at least 50% by weight of glycerol.

2. Process according to claim 1, wherein the mixture of glycerol and water contains about two parts by volume of glycerol to one part by volume of water.

HENRY CHARLES OLPIN.
ALEXANDER JAMES WESSON.

REFERENCES CITED

The following references are of record in the file of this patent:

UNITED STATES PATENTS

| Number | Name | Date |
|---|---|---|
| 2,022,710 | Esselen | Dec. 3, 1935 |
| 2,156,442 | Wood | May 2, 1939 |
| 2,347,508 | Rugeley | Apr. 25, 1944 |

FOREIGN PATENTS

| Number | Country | Date |
|---|---|---|
| 378,566 | Italy | Feb. 15, 1940 |
| 412,952 | Great Britain | July 5, 1934 |